No. 679,578. Patented July 30, 1901.
L. SCHILDKNECHT.
DRIVE CHAIN.
(Application filed May 6, 1901.)
(No Model.)
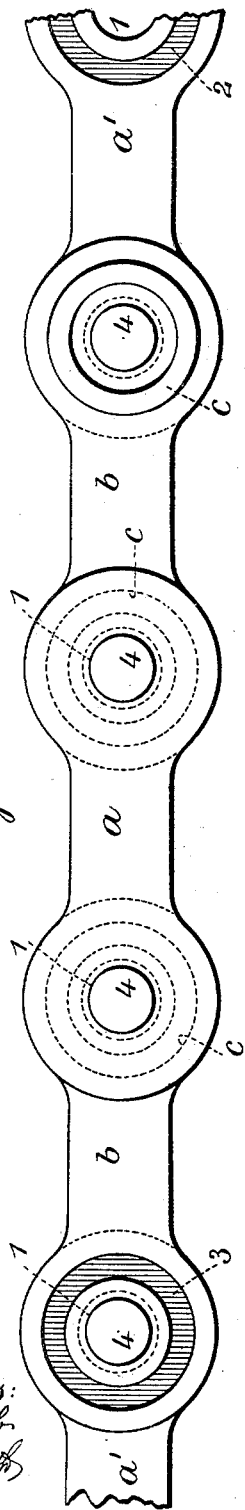
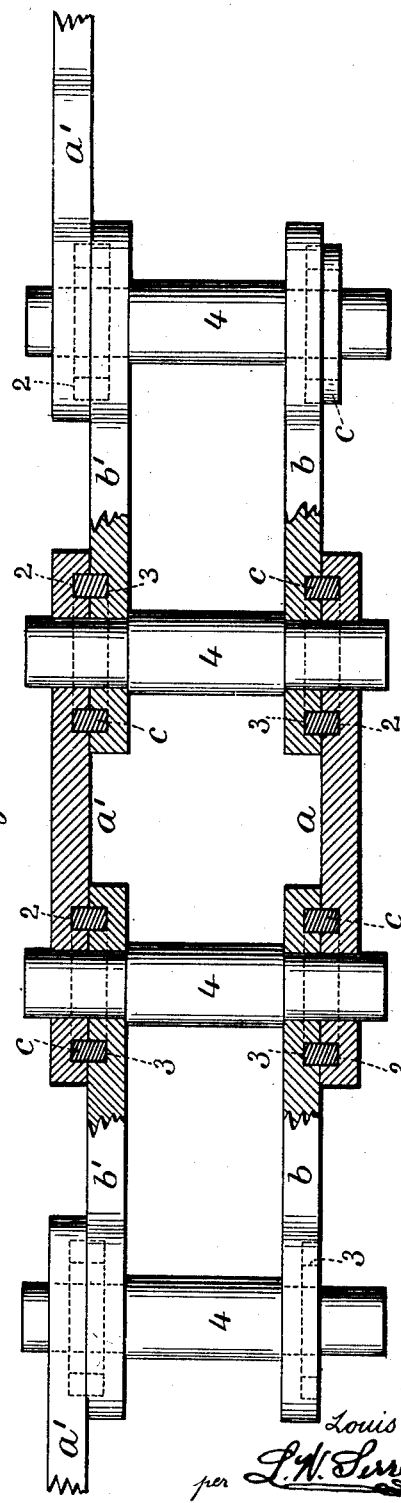
Witnesses:
J. Staib
Chas. H. Smith
Inventor:
Louis Schildknecht
per L. W. Serrell & Son
Attys.

UNITED STATES PATENT OFFICE.

LOUIS SCHILDKNECHT, OF ASTORIA, NEW YORK.

DRIVE-CHAIN.

SPECIFICATION forming part of Letters Patent No. 679,578, dated July 30, 1901.

Application filed May 6, 1901. Serial No. 58,900. (No model.)

*To all whom it may concern:*

Be it known that I, LOUIS SCHILDKNECHT, a citizen of the United States, residing at Astoria, borough of Queens, in the State of New York, have invented an Improvement in Drive-Chains, of which the following is a specification.

My invention relates to drive-chains for use with automobiles, bicycles, and other vehicles, and also for use in machinery where the well-known forms of sprocket-wheels are employed in connection with a drive-chain. Heretofore it has been usual to form these chains of links stamped up from flat plates of metal with eyes in the ends of the links to receive pivot-pins by which the pairs of links forming the chain were connected. These chains from continuous use and strain were liable to elongation or stretching produced by wear at the eyes and pivots, especially where said parts were comparatively small, and this necessitated occasionally taking out a pair of links and shortening up the chain or else separating the sprocket-wheels, either of which was disadvantageous.

My improved chain is adapted for use upon any and all occasions where the well-known forms of sprocket-wheels are employed as a drive-chain for transmitting power, and in carrying out my invention I form the links of the chain from flat plates of metal and dispose the same in oppositely-placed pairs and employ pivot-pins and eyes in the ends of the links. Each link, however, at each end and in one surface is provided with an annular recess concentric with the eye and located about midway between the eye and the edge of the link. These annular recesses are arranged opposite in adjacent faces of the links, and rings are employed fitting both the opposing annular recesses, so that the links turn on the rings and the pulling strain is taken up between the annular recesses and the rings and is not at all upon the pivot-pins or eyes of the links, the pivot-pins simply serving to hold the links of the pairs in position in forming the chain. In this manner a greater bearing-surface is consequently provided for, so that the friction is also greatly reduced.

In the drawings, Figure 1 is an elevation, and Fig. 2 a plan, partially in section, illustrating my invention.

$a$ $a'$ represent links of similar alternate pairs, and $b$ $b'$ represent links of similar intermediate alternate pairs. These links are all of the same dimensions and alike, and the description for one will answer for all. The links are preferably made with rounded ends and narrower parallel-sided intermediate portions, and each rounded end is provided with a central eye 1 to receive the reduced ends of the pivot-pins 4, and the links are stamped up from flat plates of metal. At the ends in one surface and concentric with the eyes 1 I provide annular grooves 2 3. In making up the chain similar faces of the links are brought into opposition, so that the annular grooves come into opposition with one another, and in assembling these links I place rings $c$ in these annular grooves, the rings fitting half and half in the opposite grooves. The ends of the pivot-pins are upset to secure the links to the pins in making the chain, or the links may be secured to the pins in any other well-known manner, such connection simply serving to hold the links to the pins and to prevent the links separating transversely of the chain.

When power is applied to the chain of my invention by the sprocket or equivalent wheels, around which the same passes, the power applied to the shaft of one sprocket is transmitted by the several pins engaging the same to the chain and along the chain by the pairs of links and the rings and grooves to the distant end thereof and from the chain to the second sprocket by the pins engaging the same. Consequently only a few pins at a time are employed in transmitting the power, and the pins not thus in use simply preserve the integrity of the chain, the entire strain between the distant pins in use being upon the links and annular grooves and rings. With this construction the wear of the pins at the eyes of the links is reduced to a minimum, and the grooves and rings provide a greater bearing-surface, as well as a greater wearing-surface in which the friction of the turning parts is greatly reduced.

I do not herein limit myself to the surface width of the rings c or that of the annular grooves or the depth of the grooves.

I claim as my invention—

1. A drive-chain comprising similar links in alternate and intermediate pairs with eyes at their ends and pivot-pins for holding the pairs of links together and rings between the opposing faces at the ends of the links fitting grooves in the links and upon which rings the links turn, substantially as set forth.

2. A drive-chain comprising links in similar and intermediate alternate pairs, the links being all alike and each one provided at its ends with eyes for the pivot-pins and with annular grooves concentric to the eyes and the links arranged with similar faces in opposition and rings between the ends of the links in the annular grooves and around the ends of the pivot-pins and upon which rings the links of the pairs turn, substantially as set forth.

Signed by me this 1st day of May, 1901.

LOUIS SCHILDKNECHT.

Witnesses:
 GEO. T. PINCKNEY,
 S. G. HAVILAND.